United States Patent
Hannachi et al.

(10) Patent No.: US 12,491,499 B2
(45) Date of Patent: Dec. 9, 2025

(54) PHOTOCATALYST FOR THE DEGRADATION OF METHYL ORANGE DYE

(71) Applicant: Imam Abdulrahman Bin Faisal University, Dammam (SA)

(72) Inventors: Essia Hannachi, Dammam (SA); Yassine Slimani, Dammam (SA); Muhammad Nawaz, Dammam (SA); Munirah A. Almessiere, Dammam (SA); Abdulhadi Baykal, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 537 days.

(21) Appl. No.: 18/185,106

(22) Filed: Mar. 16, 2023

(65) Prior Publication Data
US 2024/0307853 A1 Sep. 19, 2024

(51) Int. Cl.
| | | |
|---|---|---|
| *B01J 23/10* | (2006.01) | |
| *B01J 35/23* | (2024.01) | |
| *B01J 35/30* | (2024.01) | |
| *B01J 35/33* | (2024.01) | |
| *B01J 35/39* | (2024.01) | |
| *B01J 37/03* | (2006.01) | |
| *B01J 37/04* | (2006.01) | |
| *B01J 37/08* | (2006.01) | |
| *C02F 1/32* | (2023.01) | |
| *C02F 1/72* | (2023.01) | |
| *C02F 101/30* | (2006.01) | |

(52) U.S. Cl.
CPC .............. *B01J 23/10* (2013.01); *B01J 35/23* (2024.01); *B01J 35/33* (2024.01); *B01J 35/39* (2024.01); *B01J 35/393* (2024.01); *B01J 37/036* (2013.01); *B01J 37/04* (2013.01); *B01J 37/088* (2013.01); *C02F 1/32* (2013.01); *C02F 1/725* (2013.01); *C02F 2101/308* (2013.01); *C02F 2305/08* (2013.01); *C02F 2305/10* (2013.01)

(58) Field of Classification Search
CPC ...... C02F 1/32; C02F 1/725; C02F 2101/308; C02F 2305/08; C02F 2305/11; C02F 1/30; B01J 23/10; B01J 35/23; B01J 35/33; B01J 35/39; B01J 35/393; B01J 37/036; B01J 37/04; B01J 37/088
See application file for complete search history.

(56) References Cited

U.S. PATENT DOCUMENTS

2021/0184226 A1   6/2021   Kumta et al.

FOREIGN PATENT DOCUMENTS

| CN | 102951851 A | 3/2013 |
|---|---|---|
| CN | 110227528 A | 9/2019 |
| CN | 107912023 B | 10/2020 |
| CN | 113044875 A | 6/2021 |
| CN | 113694917 B | 11/2022 |

OTHER PUBLICATIONS

Munawar, et al.; Novel photocatalyst and antibacterial agent; direct dual Z-scheme ZnO—CeO2—Yb2O3 heterostructured nanocomposite; Solid State Sciences 109; 2020; 15 Pages.

Heng et al.; Strong near band edge emission of (Ce, Yb) co-doped ZnO thin films after high temperature annealing; Optical Materials Express, vol. 7, No. 8; Aug. 1, 2017; 10 Pages.

Berruti et al.; Natural solar activation of modified zinc oxides with rare earth elements (Ce, Yb) and Fe for the simultaneous disinfection and decontamination of urban wastewater; Chemosphere 303; 2022; 10 Pages.

*Primary Examiner* — Thuan D Dang
(74) *Attorney, Agent, or Firm* — Oblon, McClelland, Maier & Neustadt, L.L.P.

(57) ABSTRACT

A method of degrading a dye in an aqueous solution including contacting nanoparticles with the dye in the aqueous solution and irradiating the aqueous solution. The nanoparticles have a formula of $Zn_{1-2x}Ce_xYb_xO$, x=0.01-0.1, and where at least 90 wt. % of the dye is degraded during the irradiating of the aqueous solution.

19 Claims, 11 Drawing Sheets

PHOTOCATALYST FOR THE DEGRADATION OF METHYL ORANGE DYE

STATEMENT OF PRIOR DISCLOSURE BY INVENTOR

Aspects of the present disclosure are described in E. Hannachi, Y. Slimani, M. Nawaz, Z. Trabelsi, G. Yasin, M. Bilal, M. A. Almessiere, A. Baykal, A. Thakur, P. Thakur. "Synthesis, characterization, and evaluation of the photocatalytic properties of zinc oxide co-doped with lanthanides elements"; Journal of Physics and Chemistry of Solids; Jul. 22, 2022; 170, 110910, incorporated herein by reference in its entirety.

BACKGROUND

Technical Field

The present disclosure generally relates to the field of photocatalysis. More particularly, the present disclosure is related to a method of degrading a dye using a photocatalyst including ZnO nanoparticles co-doped with cerium (Ce) and ytterbium (Yb).

Description of Related Art

The "background" description herein generally presents the context of the disclosure. Work of the presently named inventors, to the extent it is described in this background section, as well as aspects of the description that may not otherwise qualify as prior art at the time of filing, are neither expressly nor impliedly admitted as prior art against the present invention.

Synthetic dyes have become a part of many industries and have gradually replaced natural dyes, owing to their superior performance, cost-effectiveness, and ease of production. The paper, dyeing, pulp, textile, paint, and tannery industries rely heavily on synthetic dyes to create vibrant and long-lasting colors. However, the widespread use of synthetic dyes has significantly increased their presence in industrial effluents, leading to significant environmental and biological hazards.

Effluents containing synthetic dyes have been found to harm the environment, such as through water pollution and soil contamination. The release of these dyes into water bodies can cause a change in the pH level, alter the oxygen levels and cause eutrophication, leading to a decline in aquatic biodiversity. In addition to the environmental impact, synthetic dyes harm human health. Certain dyes, such as methyl orange, have been identified as mutagens, which can cause changes in the genetic material of living organisms. Long-term exposure to these dyes can lead to genetic mutations and diseases like cancer. Thus, effluents containing such dyes must be treated innocuously.

This has led to research exploring ways to degrade these dyes in an efficient and environmentally friendly manner. Various methods exist for the removal of dyes from wastewater. These include biological, physical, and chemical dye removal methods. Chemical dye removal methods exhibit the highest dye removal percentages. Some exemplary chemical dye removal methods include oxidation, electrochemical destruction, photochemical degradation, and ultraviolet irradiation. However, the commercial feasibility of such processes has generally been limited due to high costs.

Photochemical degradation, specifically semiconductor-based photocatalytic degradation, has received much attention owing to its high efficiency and lower energy consumption. When the photocatalyst is irradiated with light, its electrons are excited from the valence band to the conduction band, forming positive holes in the valence band. In an aqueous solution, these positive holes are highly reactive and can interact with water molecules to create highly reactive hydroxyl ions. These hydroxyl ions are responsible for degrading synthetic dyes by breaking down their chemical bonds. Moreover, the reaction also produces reactive oxygen species (ROS), contributing to the efficient degradation of artificial dye molecules. ROS are highly reactive and can cause damage to organic molecules. In the case of synthetic dyes, ROS can break down the dye molecules into smaller, less harmful molecules.

The use of metal oxide nanoparticles as photocatalytic materials has been studied for their efficiency in degrading synthetic dyes. In particular, zinc oxide (ZnO) nanoparticles are among the most potent semiconducting photocatalysts reported. The photocatalytic efficiency of a material is largely dependent on various factors such as the bandgap, UV absorption characteristics, nanoparticle size, and surface area. ZnO nanoparticles are known for their properties, such as a large bandgap, high catalytic efficiency, strong UV absorption, large transparency in the visible range, reasonable cost, and environmental durability, which makes them an attractive option for use in photocatalytic applications.

Efforts have been made to improve the photocatalytic activity of ZnO nanoparticles by altering their synthesis methods and introducing dopants in the nanoparticles. However, modifying the synthesis method can impact the size and shape of the nanoparticles, which in turn can affect their photodegradation capability. For example, using a sol-gel or hydrothermal method can yield different sizes and shapes of ZnO nanoparticles, influencing their ability to absorb light and generate hydroxyl radicals.

Doping is another strategy used to enhance the photocatalytic activity of ZnO nanoparticles. Doping involves the incorporation of foreign atoms into the ZnO crystal lattice, which can alter its electronic properties and improve its photocatalytic efficiency. For instance, doping with metals such as silver, copper, or iron can enhance the absorption of visible light, which can increase the photocatalytic activity of ZnO nanoparticles in the visible light range. Doping ZnO nanoparticles with rare earth elements, such as Nd, La, Sm, etc., is a popular method for improving their photocatalytic activity. While most prior studies have focused on using a single dopant and its impact on the properties of ZnO nanoparticles, there is increasing interest in the co-doping approach. Co-doping involves simultaneously introducing at least two different dopants into the ZnO crystal lattice to create a single-phase material with enhanced properties.

Berruti et al. [Chemosphere, ISSN: 0045-6535, Vol: 303, Issue: Pt 2, Page: 135017] disclosed doped ZnO nanoparticles as photocatalysts for treating water contaminated with Diclofenac, Sulfamethoxazole, and Trimethoprim. Using the hydrothermal method, the authors prepared three different ZnO nanoparticles doped with Ce, Yb, or Fe. The reported performance of ZnO nano-photocatalysts singly doped with Ce for decontaminating water is about 80%.

Munawar et al. [Solid State Sciences, ISSN: 1293-2558, Vol: 109, Page: 106446] discussed $ZnO$—$CeO_2$—$Yb_2O_3$ heterostructured nanocomposite and pristine ZnO, $CeO_2$, and $Yb_2O_3$. Although authors have reported using a combination of lanthanides in photocatalysts, their approach differs from the co-doping approach. Zn, Ce, and Yb reportedly do not form a single nanoparticle; instead, a composite comprising a mixture of their metal oxides is formed. The authors used a simple co-precipitation technique to synthesize the nanocomposite, which showed a degradation efficiency of 80% for methyl orange (MO).

Although numerous approaches have been developed to develop ZnO-based nano-photocatalysts doped with one or more rare earth elements, their application in the dye removal process is still limited. Further, the dye degradation efficiency of the previously reported nano-photocatalysts is lower and requires a long treatment period. Thus, a need still exists to develop improved ZnO-based nano-photocatalysts to remove dyes from water in a shorter time interval with greater efficiency. Therefore, it is one object of the present disclosure to provide a co-doped ZnO-based nano-photocatalyst for efficient dye degradation.

SUMMARY

In an exemplary embodiment, a method of degrading a dye in an aqueous solution is provided. The method comprises contacting nanoparticles with the dye in the aqueous solution and irradiating the aqueous solution. The nanoparticles have a formula of $Zn_{1-2x}Ce_xYb_xO$, wherein x=0.01-0.1, and at least 90 wt. % of the dye is degraded during the irradiating.

In some embodiments, the irradiating is for less than 120 minutes.

In some embodiments, the nanoparticles have an average crystallite size of less than 40 nanometers (nm).

In some embodiments, the nanoparticles have an average crystallite size of 51-53 nm.

In some embodiments, the nanoparticles have a unit cell volume of 47.62-47.75 $Å^3$.

In some embodiments, the ZnO of the nanoparticles have a hexagonal crystal system, and wherein at least a portion of the Zn is replaced with Ce and Yb.

In some embodiments, the nanoparticles have a nanorod shape.

In some embodiments, the nanorod shape has a length of 150-250 nm.

In some embodiments, the nanorod shape has a width of 50-70 nm.

In some embodiments, the nanoparticles have a zeta potential of 10-20 millivolts (mV).

In some embodiments, the nanoparticles have a bandgap of 3.21 to 3.25 electron volts (eV).

In some embodiments, the nanoparticles further comprise 0.1-1 wt. % $Yb_{0.3}Ce_{0.4}O_{1.85}$, based on the total weight of the nanoparticles.

In some embodiments, the dye is selected from the group consisting of methylene orange, methylene blue, methyl red, phenolphthalein, bromothymol blue, and Congo red.

In some embodiments, the irradiating comprises light with a wavelength of 300-700 nm.

In some embodiments, the degrading of the dye has a rate constant of at least 0.02 per minute ($min^{-1}$).

In some embodiments, 0.1 to 10 milligrams per milliliter (mg/mL) of the nanoparticles are present in the aqueous solution.

In some embodiments, the aqueous solution has a temperature of 50 to 70° C.

In some embodiments, the aqueous solution further comprises at least one ionic species selected from the group consisting of ions of alkali metals, alkaline earth metals, halides, carbonates, phosphates, and sulfates.

In some embodiments, the nanoparticles are made by mixing separately three solutions of a zinc salt, an ytterbium salt, and a cerium salt each in water. The three solutions are mixed at a temperature of 70-90° C. for 30-120 mins to form a reaction mixture. The pH of the reaction mixture is adjusted to 7 with a base to form a second reaction mixture. The nanoparticles are obtained by evaporating the water from the second reaction mixture to form a gel, combusting the gel to form a powder, and calcining the powder at a temperature of 400 to 600° C.

The foregoing general description of the illustrative present disclosure and the following detailed description thereof are merely exemplary aspects of the teachings of this disclosure and are not restrictive.

BRIEF DESCRIPTION OF DRAWINGS

A complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
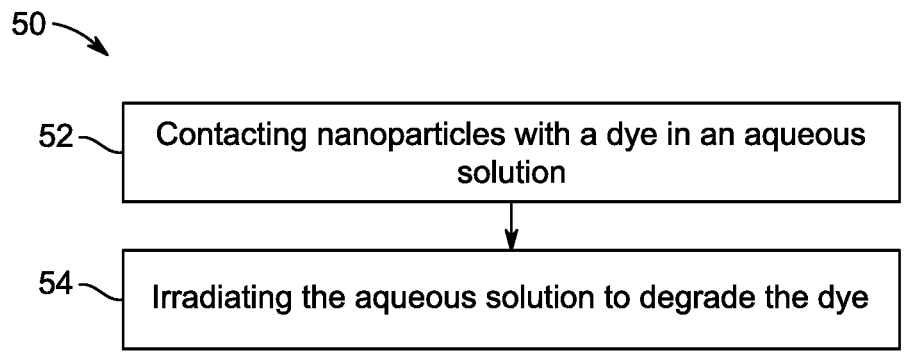
FIG. 1A is a method flow chart depicting a method of degrading a dye in an aqueous solution, according to certain embodiments.

In the drawings, like reference numerals designate identical or corresponding parts throughout the several views. Further, as used herein, the words "a," "an" and the like generally carry a meaning of "one or more," unless stated otherwise.

Where a numerical limit or range is stated herein, the endpoints are included. Also, all values and subranges within a numerical limit or range are specifically included as if explicitly written out.

Furthermore, the terms "approximately," "approximate," "about," and similar terms generally refer to ranges that include the identified value within a margin of 20%, 10%, or preferably 5%, and any values there between.

As used herein, the term "nanoparticles", refers to particles having at least one dimension, preferably the largest dimension, of size less than or equal to 2000 nm.

As used herein, the term "nanorods", refers to one-dimensional, elongated nanoparticles having rod-like or needle-like shape structure. Further, as defined herein, "nanorods" include nanoparticles having at least one dimension in the nanoscale range.

As used herein, the term "photocatalyst", refers to a material that is capable of catalyzing a chemical reaction when irradiated.

As used herein, the terms "nano-photocatalyst", "photocatalyst nanoparticle", or "photocatalytic nanoparticle", refers to nanoparticles capable of acting as a photocatalyst when irradiated. Typically, these nanoparticles are composed of semiconductor materials with a bandgap that matches the light energy absorbed from the irradiation.

As used herein, the term "room temperature", refers to a temperature in the range of 25±5° C.

As used herein, the term "aqueous solution", refers to a solution in which the solvent is water. Further, as defined herein, "aqueous solution" includes solutions primarily composed of water, or water is the major solvent present in the solution compared to other solvents. The term further includes any of the solutions or mixtures that contain water as a solvent, for example, but not limited to, true solutions, homogenous solutions, heterogeneous solutions or mixtures, colloids, suspensions, emulsions, and super-saturated solutions or mixtures.

Aspects of the present disclosure are directed to photocatalytic ZnO nanoparticles co-doped with lanthanides. In one aspect, Zinc oxide nanoparticles (NPs) may be co-doped with various concentrations of lanthanides cerium and ytterbium ($Zn_{1-2x}Ce_xYb_xO$, x=0.0, 0.01, 0.03, and 0.05) via a sol-gel auto-combustion method. The nanoparticles are suitable for photocatalytic dye degradation.

Referring to FIG. 1A, a schematic flow diagram of a method 50 of degrading a dye is illustrated. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes contacting nanoparticles with the dye in the aqueous solution. In some embodiments, the contacting refers to mixing the nanoparticles into the solution. The mixing can be by any method known in the art including but not limited to sonicating, mechanical or manual stirring.

The aqueous solution may include at least one ionic species selected from a group consisting of ions of alkali metals, alkaline earth metals, halides, carbonates, phosphates, and sulfates. In preferred embodiments, the aqueous solution is not only water and the dye, but also includes other species that would ordinarily be present in wastewater. In some embodiments, the dye-containing aqueous solution may be wastewater from oil, paint, tanning, yarn dying, wastewater treatment, pollutants separation, petrochemical, or other industries that generate aqueous effluents containing dyes. In some examples, the aqueous solution may be wastewater from textile, dying, or tanning industries. In some embodiments, the aqueous solution has a temperature of 50 to 70° C., preferably 55-65° C. or approximately 60° C. In some embodiments, the aqueous solution is room temperature.

The dye is water-soluble. The water-soluble dyes may be selected from a group consisting of acid dyes, basic dyes, pH indicator dyes, direct dyes, reactive dyes, disperse dyes, azoic dyes, vat dyes, sulfur dyes, indigo dyes, and food dyes. In some examples, the dye is selected from a group consisting of acid dyes, basic dyes, pH indicator dyes, direct dyes, dispersed dyes, azoic dyes, and food dyes. In some embodiments, the dye is selected from a group consisting of methylene orange (methyl orange), methylene blue, methyl red, phenolphthalein, bromothymol blue, congo red, orange II, metanil yellow, chrysoidine G, acid orange 7, acid orange 10, orange G, orange RL, and disperse orange 3. In some embodiments, the dye is selected from a group of methylene orange (methyl orange or MO), methylene blue, methyl red, phenolphthalein, bromothymol blue, and congo red. In a preferred embodiment, the dye is MO. In some embodiments, the wastewater contains 0.01-1,000 mg/L, preferably 0.1-100 mg/L, or 1-10 mg/L of the dye.

In some embodiments, the nanoparticles are photocatalytic ZnO nanoparticles co-doped with lanthanides. The nanoparticles are co-doped with two lanthanides: cerium (Ce) and ytterbium (Yb). In some embodiments, the nanoparticles are co-doped with three or four lanthanides. The nanoparticles co-doped with Ce and Yb have a general formula: $Zn_{1-2x}Ce_xYb_xO$. In some embodiments, x ranges from 0.00 to 0.10, preferably 0.01 to 0.10, and more preferably 0.01 to 0.03. Optionally, other lanthanides may also be used—for example, praseodymium, neodymium, promethium, samarium, europium, gadolinium, terbium, dysprosium, holmium, erbium, thulium, and lutetium.

In some embodiments, x is 0.01, and the photocatalytic ZnO nanoparticles are co-doped with Ce and Yb and have a formula: $Zn_{0.98}Ce_{0.01}Yb_{0.01}O$. In another non-limiting example, x is 0.03, and the photocatalytic ZnO nanoparticles co-doped with Ce and Yb have a formula: $Zn_{0.94}Ce_{0.03}Yb_{0.03}O$. In some embodiments, x is 0.05, and the photocatalytic ZnO nanoparticles co-doped with Ce and Yb have a formula: $Zn_{0.90}Ce_{0.05}Yb_{0.05}O$.

In some embodiments, the ZnO nanoparticles have a hexagonal, cubic, or tetragonal crystal system. In a preferred embodiment, the ZnO nanoparticles have a hexagonal crystal system. In a preferred embodiment, in the photocatalytic ZnO nanoparticles co-doped with lanthanides at least a portion of the Zn is replaced with Ce and Yb. The amount replaced by the Ce and Yb is the molar amount referred to by x above. In a preferred embodiment, the Ce and Yb replace the Zn in the crystal lattice of the ZnO in a single nanoparticle. In a preferred embodiment, the Ce and Yb and the ZnO are not a composite but rather are in the same crystal lattice. In some embodiments, the nanoparticles further comprise 0.1 wt. % to 1 wt. % $Yb_{0.3}Ce_{0.4}O_{1.85}$, preferably 0.2-0.9 wt. %, 0.3-0.8 wt. %, 0.4-0.7 wt. %, or approximately 0.5-0.6 wt. %, based on the total weight of the nanoparticles. $Yb_{0.3}Ce_{0.4}O_{1.85}$ is present due to an amount of the Yb and Ce not being incorporated into the crystal lattice of the ZnO.

The photocatalytic ZnO nanoparticles co-doped with lanthanides have an average crystallite size (D) of less than 60 nm. In some embodiments, the average crystallite size (D) is less than 55 nm. In some embodiments, the average crystallite size (D) ranges from 50 nm to 55 nm, 51 nm to 53 nm, or 40 nm to 50 nm. In some embodiments, the average crystallite size (D) is less than 40 nm. In some embodiments, the average crystallite size (D) ranges from 51 nm to 53 nm. In some embodiments, the average crystallite size (D) is in the range of 35 nm to 40 nm. In some embodiments, the average crystallite size (D) ranges from 30 nm to 35 nm.

The photocatalytic ZnO nanoparticles co-doped with lanthanides have a unit cell volume of 47.50 $Å^3$ to 48.00 $Å^3$. In a preferred embodiment, the unit cell volume ranges from 47.62 $Å^3$ to 47.75 $Å^3$. In a more preferred embodiment, the unit cell volume ranges from 47.62 $Å^3$ to 47.65 $Å^3$. The photocatalytic ZnO nanoparticles co-doped with lanthanides have a zeta potential of 5 mV to 30 mV, 8 mV to 26 mV, or 10 mV to 20 mV. The photocatalytic ZnO nanoparticles co-doped with lanthanides have a bandgap of 3.15 eV to 3.25 eV. In some embodiments, the nanoparticles have a bandgap of 3.19 eV to 3.25 eV, 3.19 eV to 3.23 eV, or 3.21 eV to 3.25 eV.

In general, the nanoparticles can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplates, nanodisks, rods (also known as nanorods), and mixtures thereof. In some embodiments, the nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanoparticles having a different shape. As used herein, the term "non-uniform shape" refers to an average consistent shape that differs by more than 10% of the distribution of nanoparticles having a different shape. In a preferred embodiment, the nanoparticles are in the form of nanorods. In some embodiments, the nanorod shape is 150-250 nm long, preferably 175-225 nm, or approximately 200 nm. In some embodiments, the nanorod shape has a width of 50-70 nm, preferably 55-65 nm, or approximately 60 nm.

The nanoparticles are present in the aqueous solution in a range of 0.1 to 10 mg/ml. In some embodiments, the nanoparticles are present in an amount of 0.01-1,000 mg/L, preferably 0.1-100 mg/L, or 1-10 mg/L.

At step 54, the method 50 includes irradiating the aqueous solution. The irradiation preferably includes visible light with a wavelength of 300-700 nm, preferably 350-650 nm, 400-600 nm, or 450-550 nm. In an embodiment, the irradiation light may be selected from a group consisting of UV light, visible light, solar light, white light, blacklight, light from an incandescent source, light from a fluorescent source, light from an LED source, light from a laser, light from lamps such as high-pressure mercury vapor lamps, metal halide lamps, low-pressure sodium lamps, sodium vapor lamps, neon lamps, xenon lamps, or halogen lamps with appropriate filters, or light from a source comprising xenon, argon, neon, sodium, tungsten, halogen, krypton, mercury, carbon dioxide, or helium and combinations thereof. In some embodiments, the UV light is from 10-300 nm, preferably 100-250 nm, or approximately 200 nm. In some embodiments, a white light source includes all the wavelengths of the visible spectrum at about an equal intensity. In a preferred embodiment, a xenon lamp may be used for irradiation. In a preferred embodiment, the xenon lamp emits light from 100-1,100 nm, preferably 200-1,000 nm, 300-900 nm, 400-800 nm, 500-700 nm, or approximately 600 nm.

In some embodiments, at least 90 wt. % of the dye is degraded during the irradiation. In a preferred embodiment, at least 94 wt. % of the dye is degraded during irradiation. In another embodiment, at least 94.8 wt. % of the dye is degraded during irradiation. In another embodiment, at least 98 wt. % of the dye is degraded during irradiation. In some embodiments, the irradiating is for less than 120 minutes, preferably 1-120 minutes, 10-80 minutes, or 30-60 minutes. In some embodiments, the degrading of the dye has a rate constant of at least 0.02 $min^{-1}$. In some embodiments, the degrading of the dye has a rate constant of at least 0.024 $min^{-1}$. In some embodiments, the degrading of the dye has a rate constant of at least 0.027 $min^{-1}$.

Figure 10:
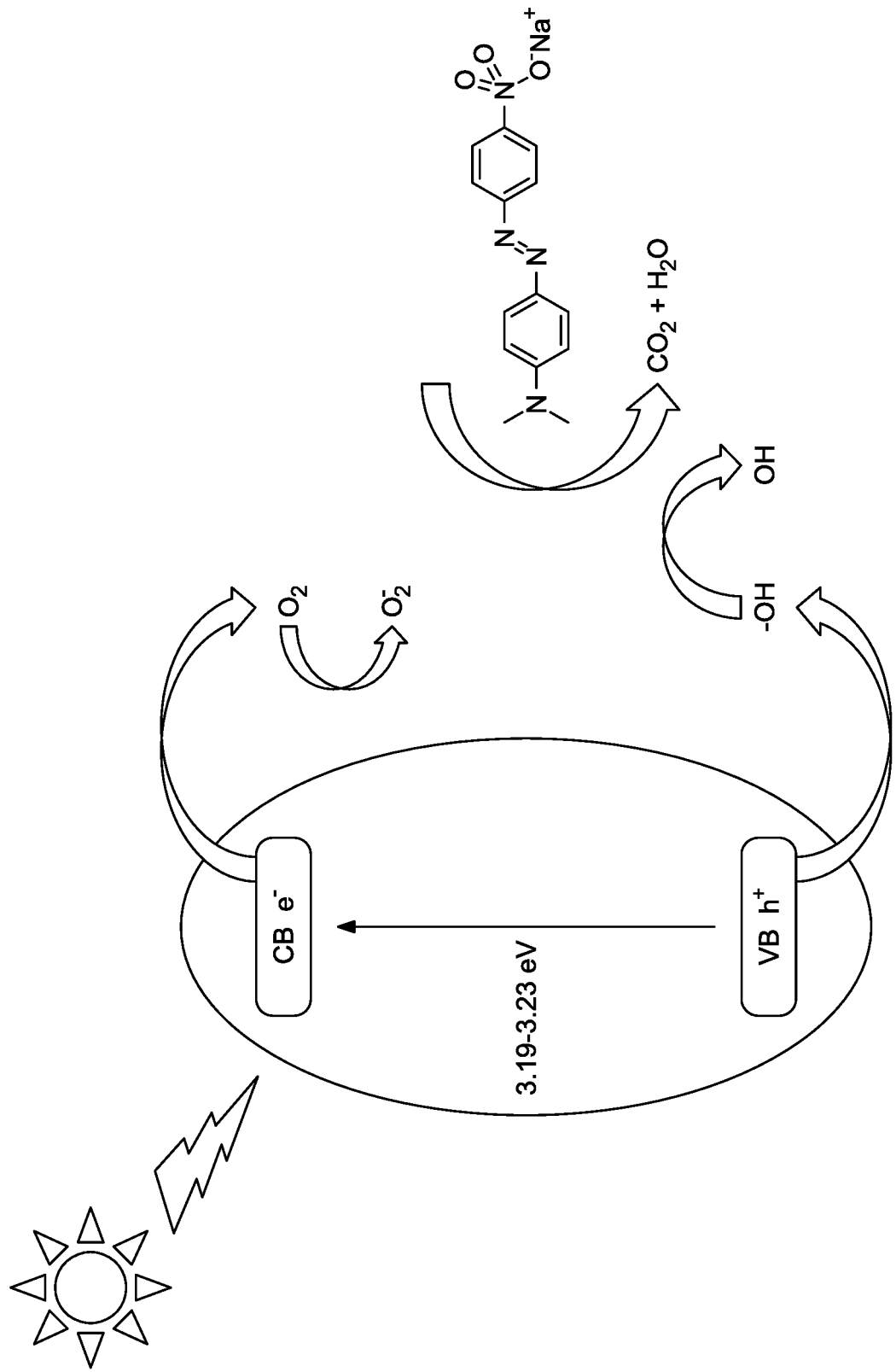
FIG. 10 shows a proposed reaction mechanism of the photocatalytic degradation of the methyl orange using Ce and Yb co-doped ZnO nano-photocatalyst, according to certain embodiments.

While not wishing to be bound to a single theory, referring to FIG. 10, a proposed reaction mechanism of an embodiment of the photocatalytic degradation of methyl orange using the as-prepared Ce and Yb co-doped ZnO nano-photocatalyst is shown. One of ordinary skill in the art would recognize that FIG. 10 could be adapted to include a different dye. As seen in FIG. 10, upon light irradiation, the electrons in the valence band jump to the conduction band, generating electron-hole pairs. The separation of electron-hole pairs on the surface of ZnO nanoparticles contributes to the redox reaction with the adsorbed methyl orange. The differences in the photocatalytic activities on increasing the concentration of dopants may depend on the nature of the doping elements and their concentrations. The electron in the conduction band of the prepared nano-photocatalysts reduces the molecular oxygen to $\cdot O^{2-}$ while holes in the valence band interacts with OH to generate $\cdot OH$ radicals resulting in degradation and reduction of methyl orange.

It is thought that the present method provides improved results by introducing multiple dopants, as this improves the separation of photo-generated electron-hole pairs, which thereby improves photocatalysis. Moreover, the co-doping approach also changes the bandgap structure of the ZnO nanoparticles, enabling them to respond to a broader range of the solar spectrum, including the visible light range. The co-doping approach has several advantages over single-doping methods. First, co-doping can introduce additional energy states that can trap photo-generated charges and prolong their lifetime, improving photocatalytic efficiency. Second, co-doping can also enhance the stability of the ZnO nanoparticles under illumination, ensuring they maintain their photocatalytic activity over time. Finally, co-doping can be used to tailor the properties of ZnO nanoparticles for specific applications, such as removing particular dyes or pollutants from wastewater.

Figure 1B:
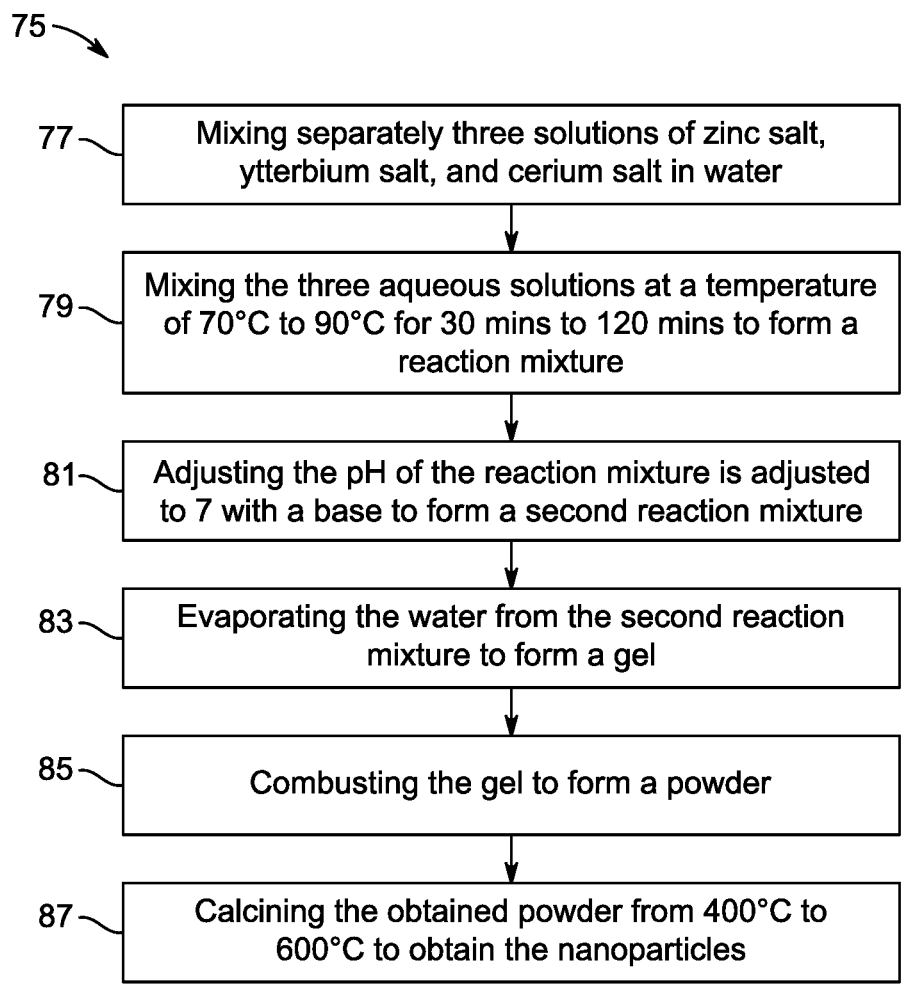
FIG. 1B is a method flow chart depicting a method of making nanoparticles of the present disclosure, according to certain embodiments.

Referring to FIG. 1B, a schematic flow diagram of a method 75 of preparing photocatalytic ZnO nanoparticles co-doped with lanthanides Ce and Yb is disclosed. The order in which the method 75 is described is not intended to be construed as a limitation, and any number of the described method steps can be combined in any order to implement the method 75. Additionally, individual steps may be removed or skipped from the method 75 without departing from the spirit and scope of the present disclosure.

At step 77, the method 75 includes mixing separately three solutions of zinc salt, ytterbium salt, and cerium salt in water. In some examples, nitrate salts are used. Optionally, other salts of zinc, yttrium, and cerium, such as, chloride, nitrites, sulfates, sulfites, carbonates, or a combination thereof, may be used. In some examples, the salts are hydrated. In some embodiments, nitrate salts comprising six water molecules of hydration are used. The mixing is performed, with a stirrer, at room temperature under constant stirring to obtain the three aqueous solutions.

At step 79, the method 75 includes mixing the three aqueous solutions at a temperature of 70° C. to 90° C. for 30 mins to 120 mins to form a reaction mixture. In some embodiments, the three aqueous solutions are mixed at an 80° C. for 60 mins to form the reaction mixture.

At step 81, the method 75 includes adjusting the pH of the reaction mixture to 7 with a base to form a second reaction mixture. In some embodiments, the base is selected from a group of sodium hydroxide, potassium hydroxide, calcium hydroxide, and ammonium hydroxide. In a preferred embodiment, the base is sodium hydroxide.

At step 83, the method 75 includes evaporating the water from the second reaction mixture to form a gel. The evaporation of water may be performed by any conventional method or apparatus known to the person skilled in the art, for example, but not limited to using a hot plate, a magnetic stirrer with a heating mantle, or a rotary evaporator. In some embodiments, the water is evaporated using a hot plate to form the gel. In some embodiments, the gel is foamed before step 85. In some embodiments, the foaming is by blowing a gas through the gel to create air pockets. The gas is any gas known in the art including but not limited to nitrogen, argon and carbon dioxide.

At step 85, the method 75 includes combusting the gel to form a powder. In some examples, the combustion process to obtain the powder is assisted by at least one fuel. In some examples, the fuel is selected from a group including urea, glycine, hydrazides, citric acid, hexamethylene tetraamine, glucose, sucrose, stearic acid, ethylene glycol, ethanolamine, alanine, aspartic acid, valine, and leucine. In a non-limiting example, the fuel used is citric acid.

At step 87, the method 75 includes calcining the obtained powder from 400° C. to 600° C. to obtain the nanoparticles. In some examples, the powder is calcined at 500° C. for 4 hours to obtain the nanoparticles. The calcination of the powder may be performed by any conventional method or apparatus known to the person skilled in the art, for example, but not limited to, by using a muffle furnace, electric furnace, tube furnace, box furnace, crucible furnace, microwave furnace, vacuum furnace, rotary kiln, or fluidized bed furnace.

EXAMPLES

The disclosure will now be illustrated with working examples, which is intended to illustrate the working of disclosure and not intended to restrictively imply any limitations on the scope of the present disclosure.

Example 1: Materials

Zinc nitrate hexahydrate [$Zn(NO_3)_2 \cdot 6(H_2O)$; 99%], ytterbium nitrate hexahydrate [$Yb(NO_3)_3 \cdot 6(H_2O)$; 99.9%], and cerium nitrate hexahydrate [$Ce(NO_3)_3 \cdot 6(H_2O)$; 99%] were used to prepare the Ce and Yb co-doped ZnO nano-photocatalyst samples. All reagents were purchased from Sigma Aldrich.

Example 2: Synthesis of the Nanoparticles

Ce and Yb co-doped ZnO nanoparticles (NPs) were prepared using the sol-gel auto-combustion method. Specifically, various samples of ZnO NPs having general formula $Zn_{1-2x}Ce_xYb_xO$ were synthesized with the following concentrations of lanthanides: (a) x=0.0 (CYZO0), (b) x=0.01 (CYZO1), (c) x=0.03 (CYZO3), and (d) x=0.05 (CYZO5).

To synthesize ZnO NPs doped with varying concentrations of lanthanides, Zn-, Ce-, and Yb-based-nitrates were separately dissolved in water (30 mL) at room temperature under constant stirring. The aqueous solutions were mixed and stirred continuously for 60 min at 80° C. to obtain a homogeneous mixture. Sodium hydroxide (NaOH) solution was added to the mixture to adjust the pH to 7. Citric acid was added as fuel to assist the combustion process. While stirring, the obtained solution was vaporized on a hot plate, which changed to a gel upon complete evaporation of water. The obtained gel was then transformed into foam and exposed to a combustion reaction to form a fine powder which was subsequently calcined at 500° C. for 4 hours.

Example 3: FT-IR Analysis

For the assessment of elemental constituents and chemical bonding in the synthesized photocatalyst nanoparticle samples, FT-IR analysis was performed. FT-IR spectra of the different samples were registered in the wavenumber range of 400-4000 $cm^{-1}$ using the Bruker alpha-II FT-IR spectrometer (manufactured by Bruker, 40 Manning Road Billerica, MA 01821 United States).

Figure 2:
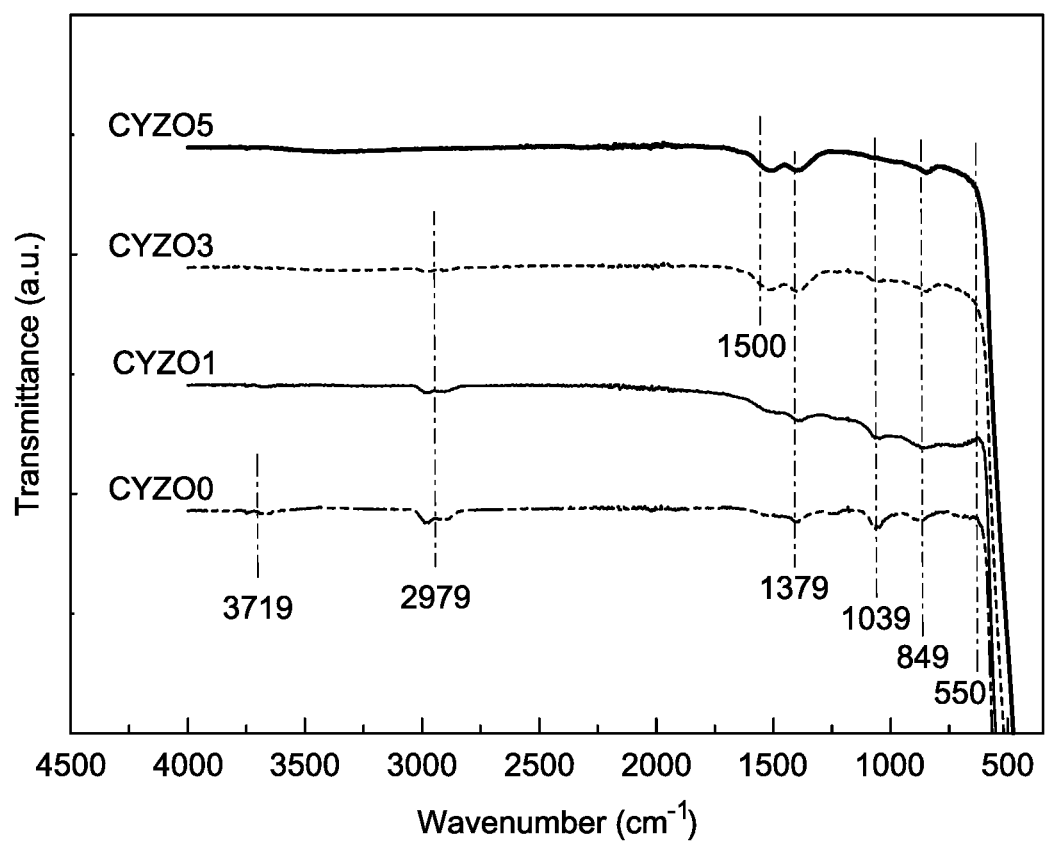
FIG. 2 shows Fourier Transform Infrared (FT-IR) spectra of various nano-photocatalyst samples (CYZO0, CYZO1, CYZO3, and CYZO5), according to certain embodiments.

Referring to FIG. 2, FT-IR spectra of the as-prepared nano-photocatalyst samples CYZO0, CYZO1, CYZO3, and CYZO5 are shown. As depicted, the spectra validate the formation of the ZnO structure. The undoped CYZO0 sample showed six absorption bands. The bands around 550 $cm^{-1}$ and 850 $cm^{-1}$ are owing to the metal-oxygen groups. A sharp peak at about 1380 $cm^{-1}$ is attributed to H—O—H bending vibrations, attributed to a few amounts of $H_2O$ in the ZnO nanocrystals. The peak observed at 2970 $cm^{-1}$ is due to the C—H bonds. Broad bands at 1039 $cm^{-1}$ and 3719 $cm^{-1}$ are ascribed to the C—O and O—H stretching vibrations, respectively. As the concentration of Ce and Yb increases in the CYZO3 and CYZO5 samples, a sharp peak at around 1500 $cm^{-1}$ associated with the C═O stretching modes is also detected. Compared to the pure ZnO sample CYZO0, a slight shift towards a lower wavenumber is observed for the CYZO1, CYZO3, and CYZO5 co-doped samples. Compared to the zinc atoms, cerium and ytterbium atoms are heavier; hence, according to the vibrational mode theories, the substitution caused a downward shifting of the fundamental phonon modes in mixed crystals. The observed downward shifting in the present system indicates the substitution of Ce and Yb ions in the ZnO lattice.

Example 4: XRD Analysis

The crystalline structure of the as-prepared nano-photocatalyst samples was examined using a Rigaku MiniFlex X-ray diffractometer (manufactured by Rigaku, 2601A, Tengda Plaza, No. 168, Xizhimenwai Ave.0) in a 2θ range of 20°-80° and step size of 0.02° with CuKα radiation ($\lambda$=1.5406 Å).

Figure 3:
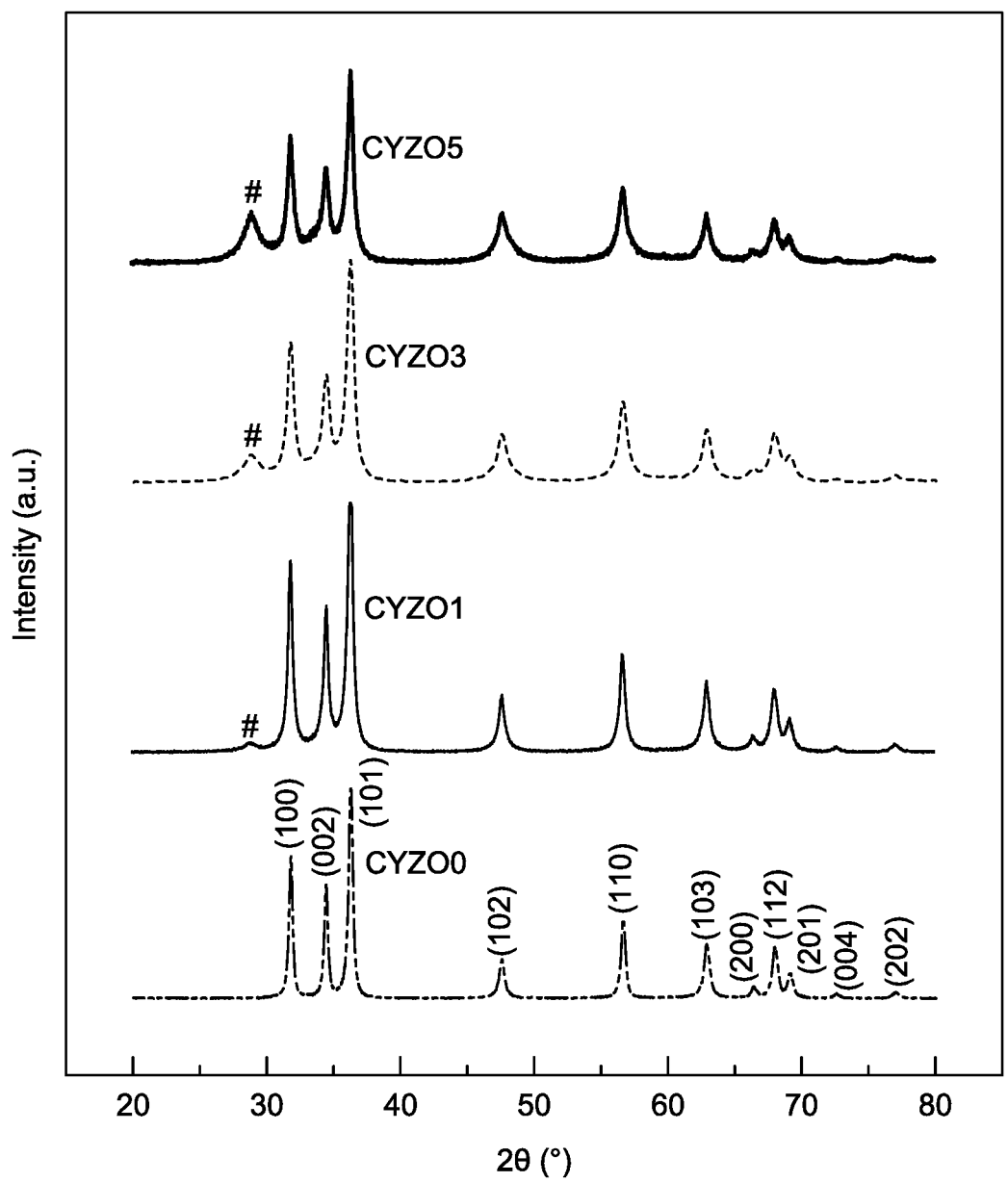
FIG. 3 shows an X-ray diffraction (XRD) pattern of the various nano-photocatalyst samples, according to certain embodiments.

Referring to FIG. 3, XRD patterns of the as-prepared nano-photocatalyst samples CYZO0, CYZO1, CYZO3, and CYZO5 are shown. All XRD peaks can be indexed to ZnO hexagonal structure with space group P6$_3$mc space group based on the JCPDS standard card No. 36-1451. For example, peaks attributed by the symbol # in FIG. 3 designate $Yb_{0.3}Ce_{0.4}O_{1.85}$ secondary phase. As shown, the intensity of this peak increases as the concentration of Ce and Yb increases.

Figure 4A:
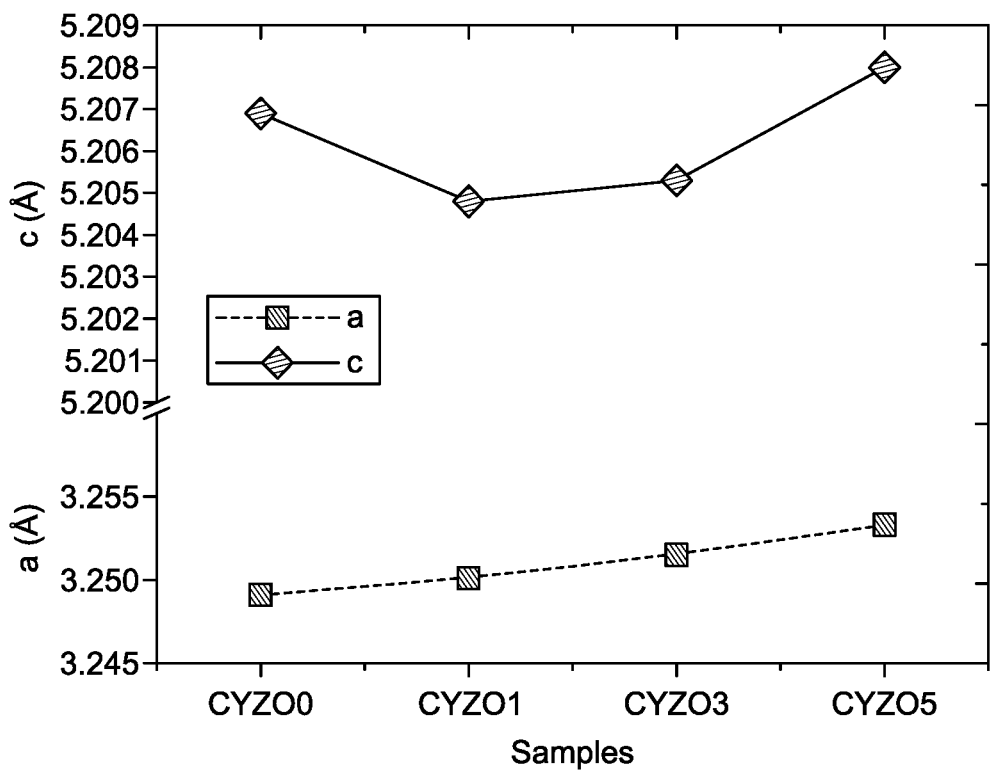
FIG. 4A shows a variation of lattice parameters with Ce and Yb co-doping for the various nano-photocatalyst samples, according to certain embodiments.

For the refinement of crystalline lattice constants, the Rietveld method was used. Referring to FIG. 4A, the variations of lattice parameters with respect to the as-prepared nano-photocatalyst samples CYZO0, CYZO1, CYZO3, and CYZO5 are shown. The lattice parameters are a=b=3.2491 Å and c=5.2069 Å for the CYZO0 sample. For CYZO1, the lattice constants are a=b=3.2501 Å and c=5.2048 Å. For CYZO3, the lattice constants are a=b=3.2515 Å and c=5.2053 Å. For CYZO5, the values of the lattice constants are a=b=3.2533 Å and c=5.2080 Å. The increasing values of the lattice constants from CYZO0 to CYZO5 indicate that the Ce and Yb ions substituted Zn ions in the ZnO structure.

Figure 4B:
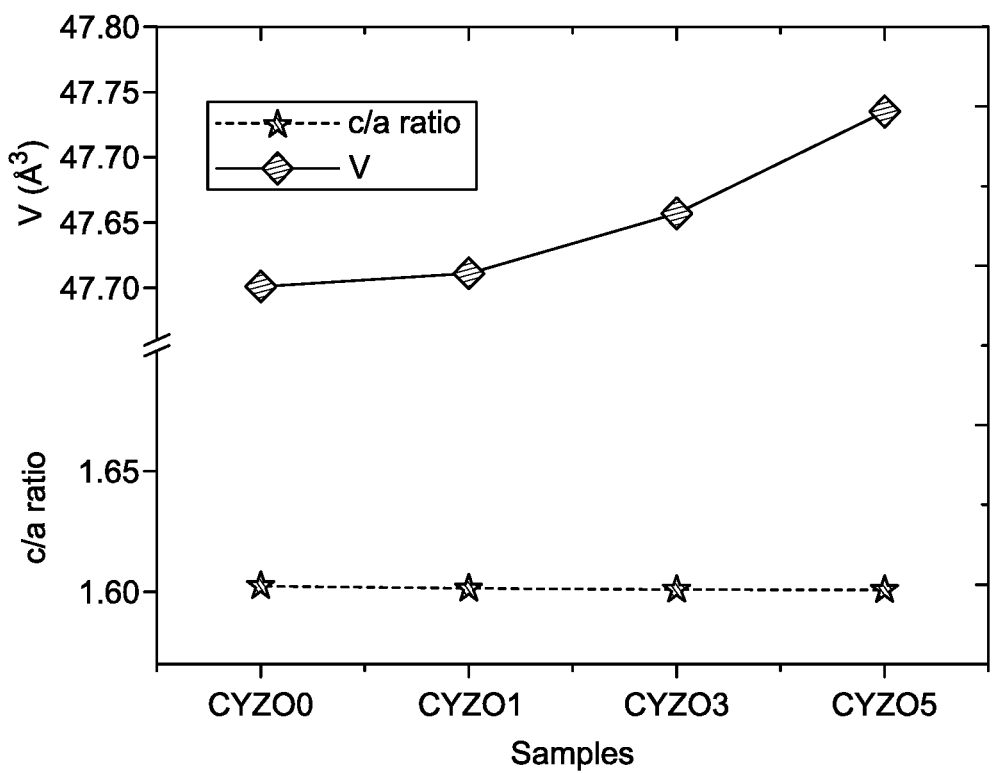
FIG. 4B shows the variations of the unit cell volume V and c/a ratio with respect to the various nano-photocatalyst samples, according to certain embodiments.

Referring to FIG. 4B, the variations of the unit cell volume V and c/a aspect ratio with respect to the as-prepared nano-photocatalyst samples CYZO0, CYZO1, CYZO3, and CYZO5 are illustrated. The values of the c/a ratio are 1.6025, 1.6014, 1.6009, and 1.6008 for CYZO0, CYZO1, CYZO3, and CYZO5, respectively. These obtained values are consistent with the ordinary value c/a=1.6. The unit cell volume V was calculated as V=0.866a$^2$c Å$^3$.

The progressive increase in the unit cell volume V from CYZ0 to CYZO5 was qualitatively attributed to the size of the ions and their local coordination. Substitution of the $Zn^{2+}$ ions (0.74 Å) by the $Yb^{2+}$ (1.02 Å) and $Ce^{3+}$ (1.01 Å) ions are the reason for the expansion in the unit cell volume V. This increase in the lattice parameters was attributed to the interstitial introduction of the cerium ions and ytterbium ions in the ZnO lattice.

Figure 5:
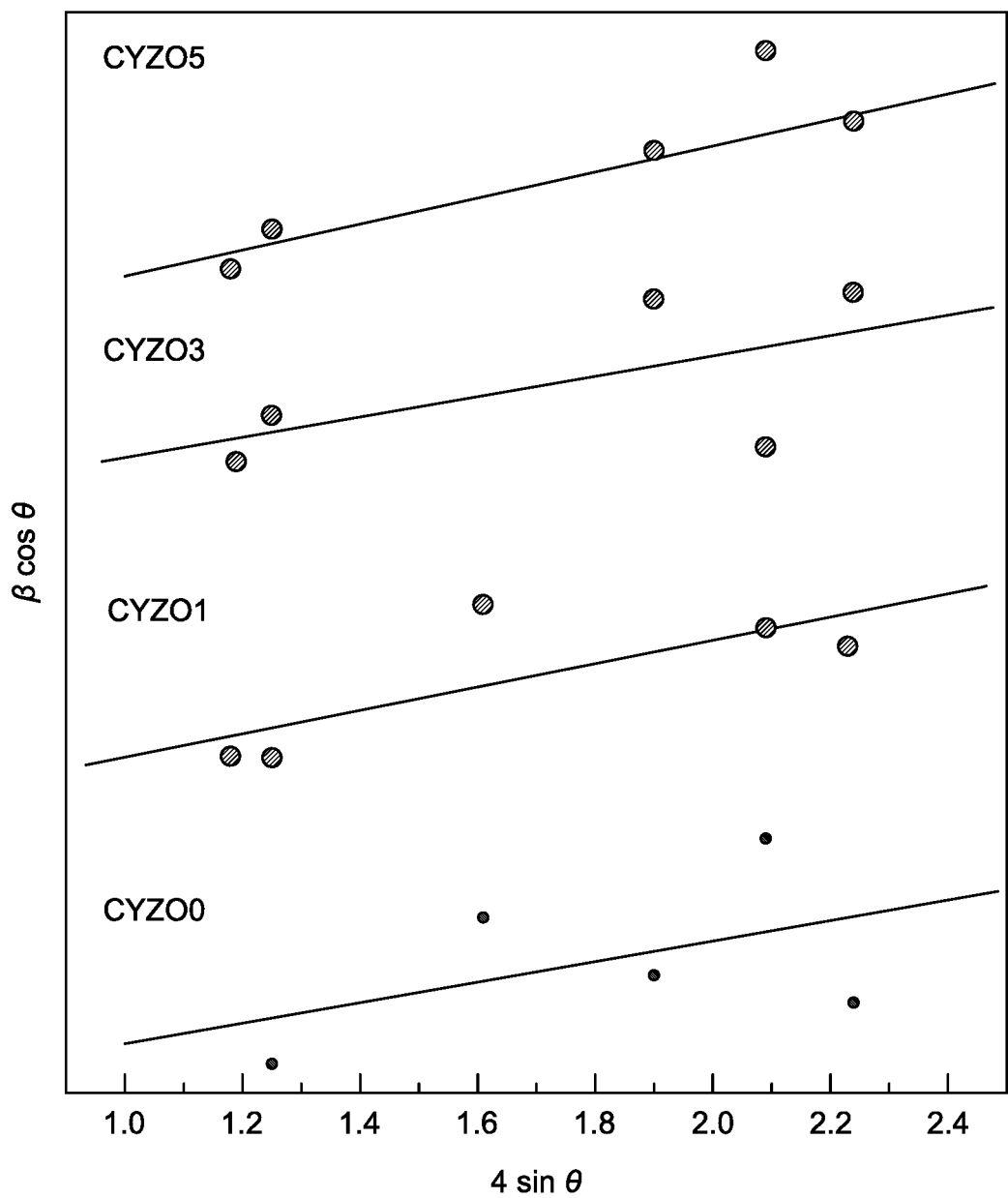
FIG. 5 shows the Williamson-Hall plots for the various nano-photocatalyst samples, according to certain embodiments.

Referring to FIG. 5, the Williamson-Hall plots of the nano-photocatalyst samples CYZO0, CYZO1, CYZO3, and CYZO5 are shown. The Williamson-Hall model, indicated by the following equation, was used to calculate the average crystallite size (D) and micro-strain (ε):

$$\beta\cos\theta = \frac{(0.9)\lambda}{D} + \varepsilon(4\sin\theta),$$

where θ, β, and λ are the Bragg's angle position, full width at half maximum, and XRD wavelength, respectively. In FIG. 5, the slope, and the y-intercepts of the linearly fitted straight lines give the values of ε and D, respectively. For the samples, the computed ε and D values are provided in Table 1 below.

TABLE 1

Structural parameters and Zeta potential results for CYZO0, CYZO1, CYZO3, and CYZO5 nano-photocatalysts

| Samples | Crystallite size D (nm) | Micro-strain ε × 10$^{-3}$ | Polydispersity index PDI | Zeta potential ZP (mV) |
|---|---|---|---|---|
| CYZO0 | 53.24 ± 0.05 | 0.53 | 0.492 | 20.1 ± 5.26 |
| CYZO1 | 52.28 ± 0.05 | 0.79 | 0.604 | 19.5 ± 4.23 |
| CYZO3 | 34.90 ± 0.05 | 1.23 | 0.433 | 12.6 ± 3.74 |
| CYZO5 | 36.85 ± 0.05 | 1.01 | 0.525 | 13.2 ± 3.60 |

As observed in Table 1, the average crystallite size (D) reduces with increasing content of Yb and Ce elements while the micro-strain & increases. The reduction in the crystallite size is to the deformation of the host ZnO network caused by the Ce and Yb ions, which hinders the nucleation and minimize the growth rate.

Example 5: Zeta Potential (ZP) Analysis

Table 1 from Example 4 also shows the zeta potential (ZP) and polydispersity index (PDI) for the nano-photocatalyst samples CYZO0, CYZO1, CYZO3, and CYZO5. Zeta potential results of the samples were examined using a ZEN5600, Malvern, UK Zetasizer instrument (manufactured by Enigma Business Park, Grovewood Rd. Malvern WR141XZ, United Kingdom).

Zeta potential is a measure of the stability of distributed nanoparticle systems. Typically, a high value of zeta potentials in nanoparticles, whether positive or negative, is preferred. According to Table 1, the highest zeta potential is observed for CYZO0 and CYZO1, and as the concentration of lanthanides increases from CYZO0 to CYZO5, zeta potential gets reduced. The higher ZP value indicates more stability, due to the formation of more stable dispersions and interparticle electrostatic repulsion.

Generally, ZnO nanoparticles are recognized to possess positive surface charges in the ready state. The uniform size distribution is indicated by PDI, where the value is less than 0.5, which designates a stable particle size distribution. Table 1 shows fewer variations in the polydispersity index (PDI) of the nano-photocatalyst samples CYZO0, CYZO1, CYZO3, and CYZO5.

Example 6: Optical Analysis

Figure 6A:
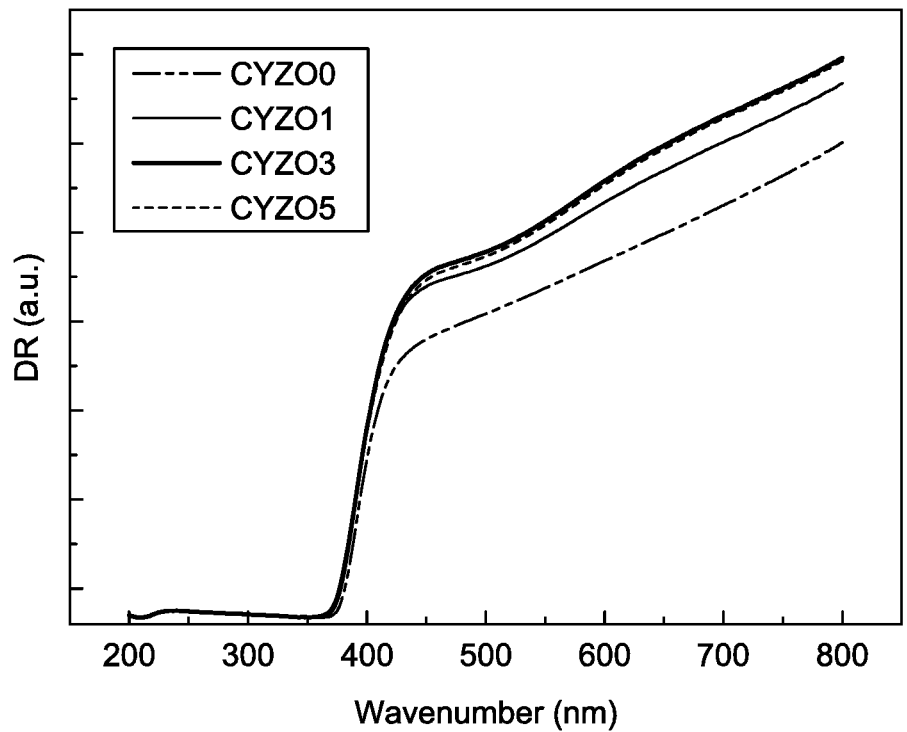
FIG. 6A shows the diffuse reflectance (DR) spectra of the various nano-photocatalyst samples, according to certain embodiments.

The optical properties were acquired using a UV-Vis spectrophotometer (JASCO V-750) (manufactured by 2967-5, Ishikawa-machi, Hachioji, Tokyo 192-8537, Japan). Referring to FIG. 6A, the diffuse reflectance (DR) spectra of the nano-photocatalyst samples CYZO0, CYZO1, CYZO3, and CYZO5 are shown. The reflectance increases with increasing the concentration of Yb and Ce elements. The DR spectra indicate a shift of absorption edges, signifying the change in the optical bandgap with Yb and Ce doping. The reflectance R is correlated with the absorbance a via Kubelka-Munk (KM) function F(R) as:

$$F(R) = \frac{(1-R)^2}{R} = \alpha/s,$$

where s is the scattering coefficient.

Figure 6B:
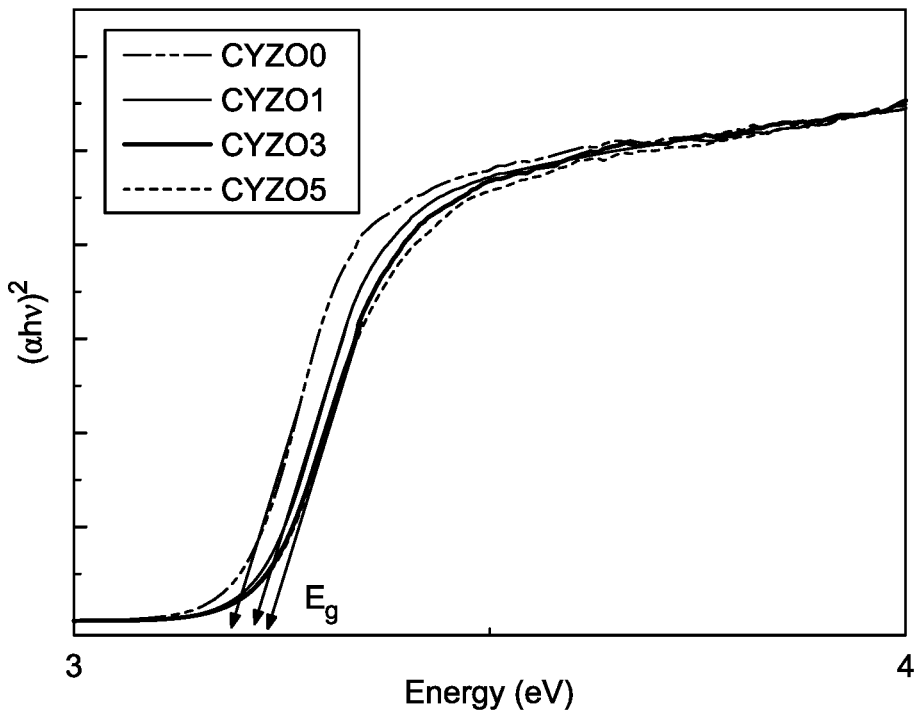
FIG. 6B shows the Tauc plots of the various nano-photocatalyst samples, according to certain embodiments.
Figure 7A:
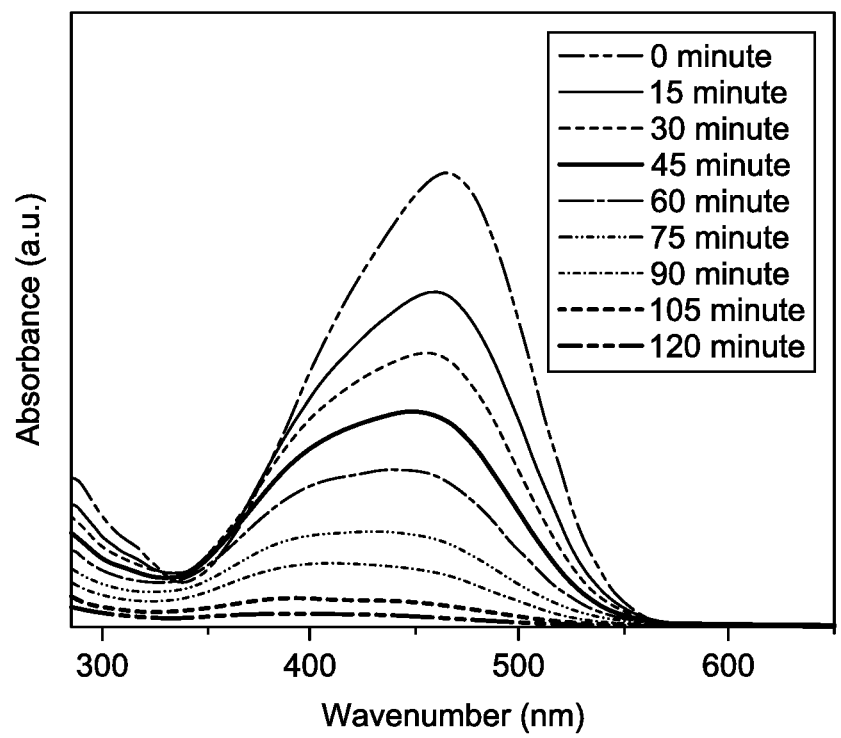
FIG. 7A shows a time-dependent ultraviolet (UV)-visible spectra of methyl orange in the presence of the nano-photocatalyst sample, CYZO0, according to certain embodiments.
Figure 7B:
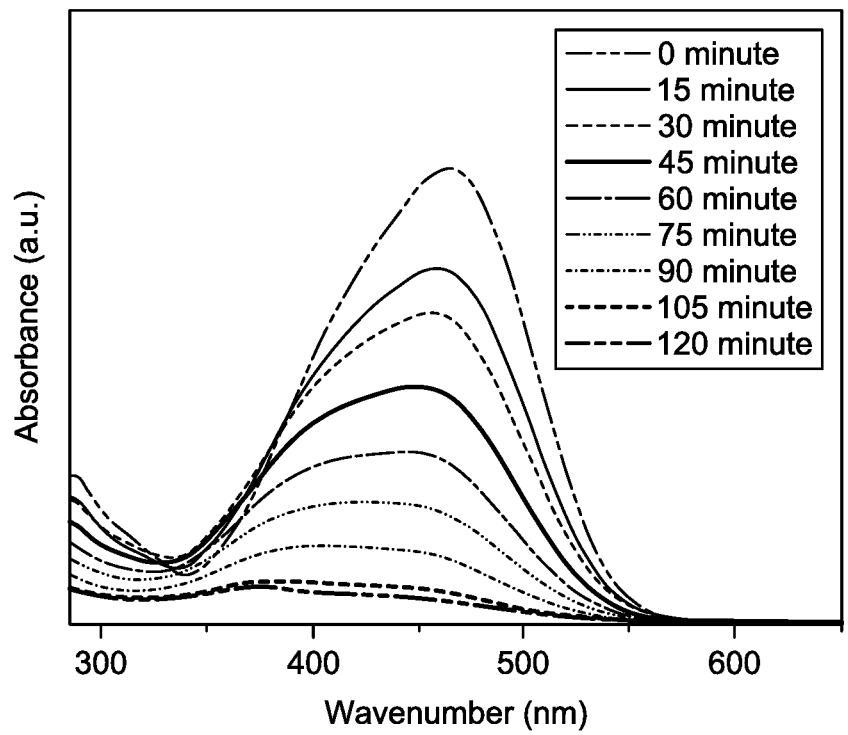
FIG. 7B shows the time-dependent UV-visible spectra of the methyl orange in the presence of the nano-photocatalyst sample, CYZO1, according to certain embodiments.
Figure 7C:
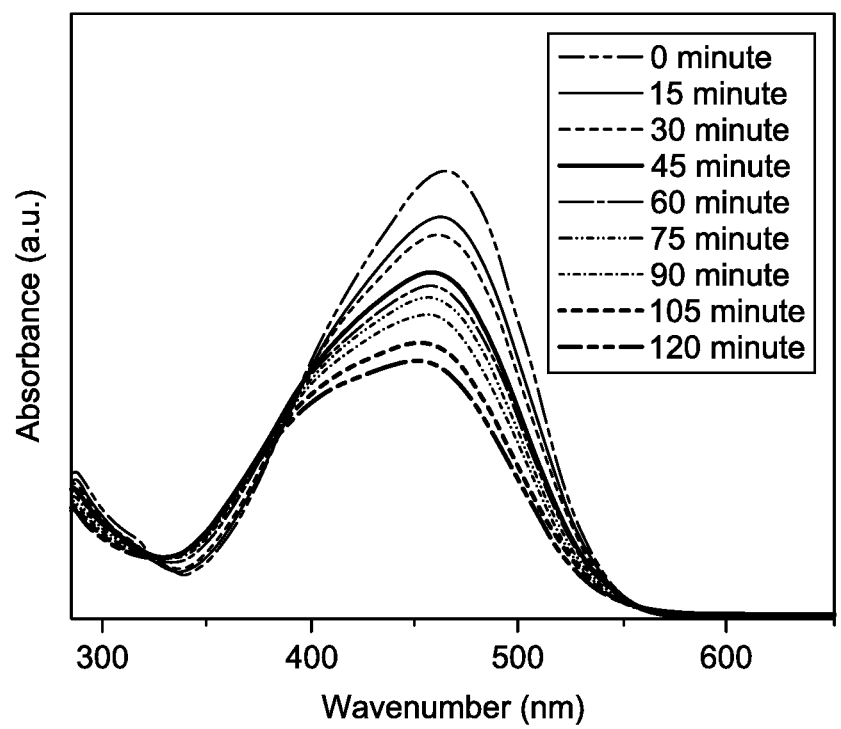
FIG. 7C shows the time-dependent UV-visible spectra of the methyl orange in the presence of the nano-photocatalyst sample, CYZO3, according to certain embodiments.
Figure 7D:
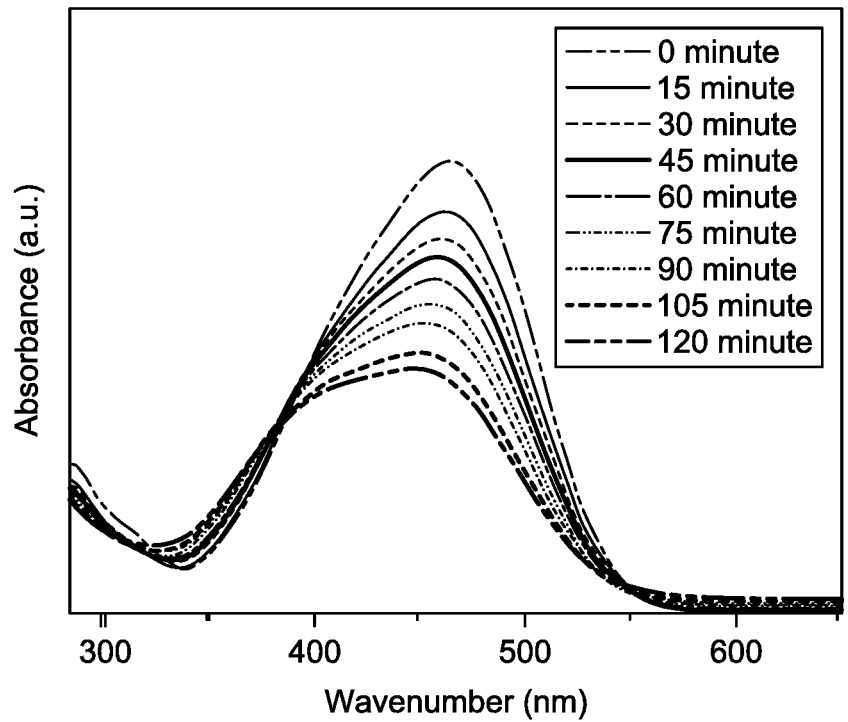
FIG. 7D shows the time-dependent UV-visible spectra of the methyl orange in the presence of the nano-photocatalyst sample, CYZO5, according to certain embodiments.

Referring to FIG. 6B, the Tauc plots of the nano-photocatalyst samples CYZO0, CYZO1, CYZO3, and CYZO5 are shown. The bandgap energy is determined using the KM function:

$$[F(R)h\nu]^n = A(h\nu - E_g).$$

As seen in FIG. 6B, the value of bandgap energy $E_g$ was obtained by extrapolating the fitted lines to the x-axis. $E_g$ is equal to 3.19 eV, 3.21 eV, 3.22 eV, and 3.23 eV for CYZO0, CYZO1, CYZO3, and CYZO5, respectively. The slight improvement in the bandgap designates substituting $Ce^{3+}$ ions and $Yb^{2+}$ ions for $Zn^{2+}$ sites in ZnO. This may be interpreted by the Burstein-Moss shift. Replacing $Zn^{2+}$ ions with $Ce^{3+}$ ions and $Yb^{2+}$ ions produce more oxygen vacancies to sustain the neutrality of charges in the lattice. These oxygen vacancies provide additional electrons to carry them and result in an increase in carrier density. This results in a change in the Fermi level near the conduction band. This also causes changes in the transition levels resulting in a shift in the bandgap energy. Another plausible reason for this slight variation in $E_g$ with Yb and Ce may be the reduction of the crystallite size and the effect of the grain boundary. Because of the increased surface-to-volume ratio, the effect of band bending occurs at the grain boundary. The effect of band bending is large for tinier grains, while for larger grains, it becomes flat.

Example 7: Photocatalytic Activity Assessment

The photocatalytic activities of the as-prepared samples CYZO00, CYZO01, CYZO03, and CYZO05 were examined by evaluating the photodegradation of the methyl orange dye. For this purpose, 50 mg of CYZO00, CYZO01, CYZO03, and CYZO05 photocatalysts were suspended in 50 mL of an aqueous solution containing 10 mg/L of the organic pollutant methyl orange solution. The mixture was continuously stirred in the dark to guarantee equilibrium between the photocatalyst and methyl orange; then, it was placed under a xenon lamp. Aliquots were withdrawn and centrifuged at regular periods. to remove the CYZO00, CYZO01, CYZO03, and CYZO05 samples. The concentration of methyl orange was determined at 464 nm on the JASCO V-750 UV-visible spectrophotometer. The degradation percentage was computed as follows:

$$\text{Degradation (\%)} = \frac{C_0 - C}{C_0} \times 100,$$

where $C_0$ is the initial concentration of methyl orange, and C is the time-dependent concentration of methyl orange.

Figure 8A:
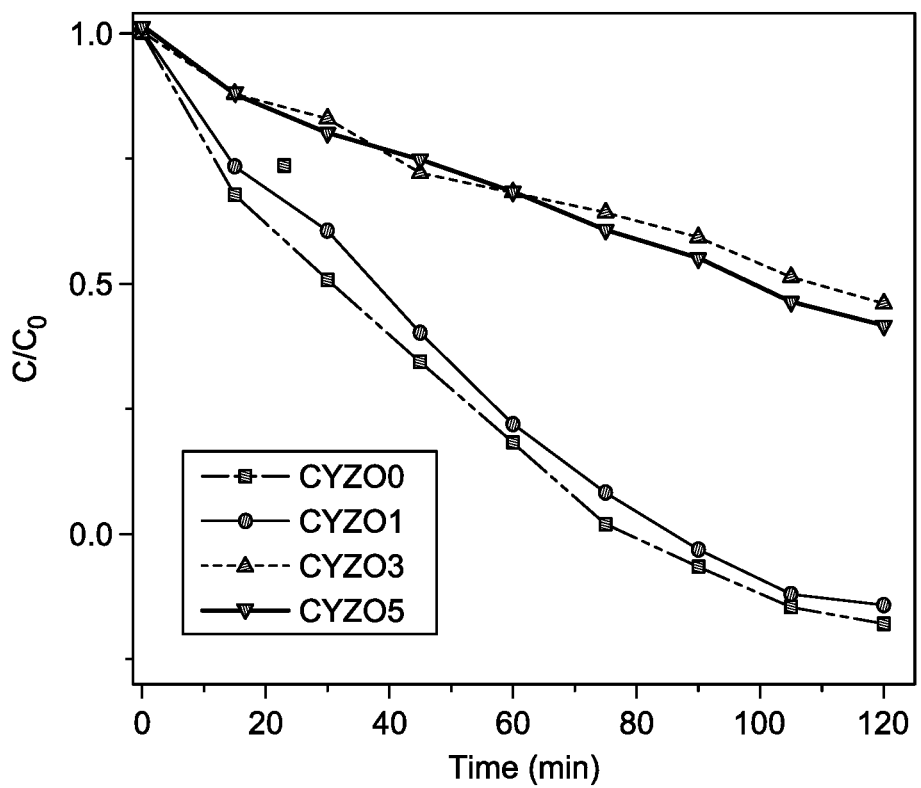
FIG. 8A shows the variation of $C_0/C$ versus time for the various nano-photocatalyst samples, according to certain embodiments.
Figure 8B:
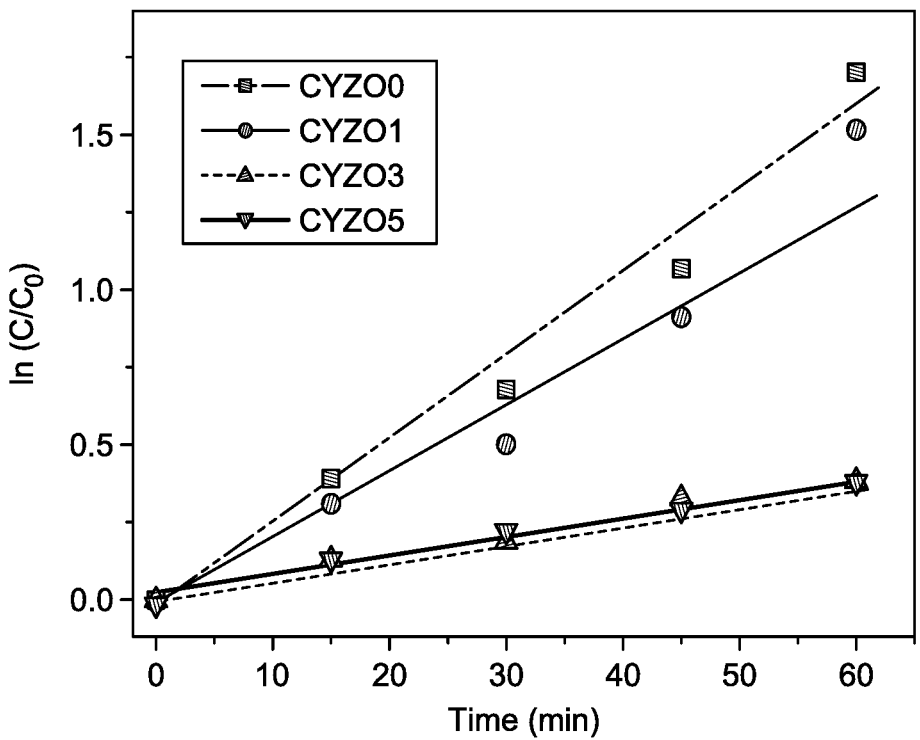
FIG. 8B shows the plots of $ln(C_0/C)$ versus time for the various nano-photocatalyst samples, according to certain embodiments.
Figure 9A:
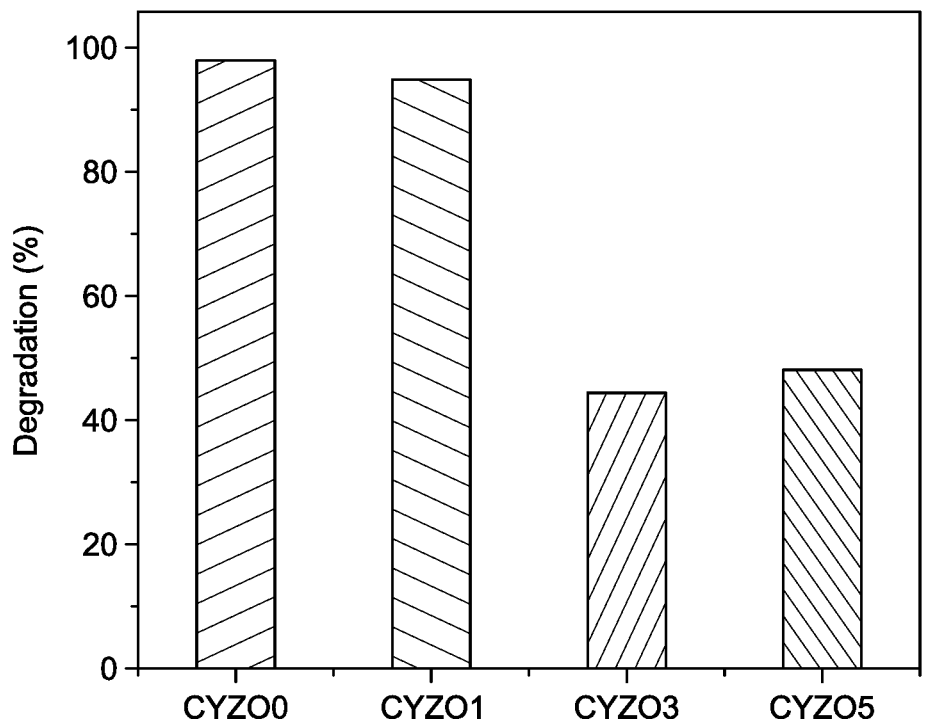
FIG. 9A shows the kinetics of the photocatalytic degradation reactions carried out using the various nano-photocatalyst samples, according to certain embodiments.
Figure 9B:
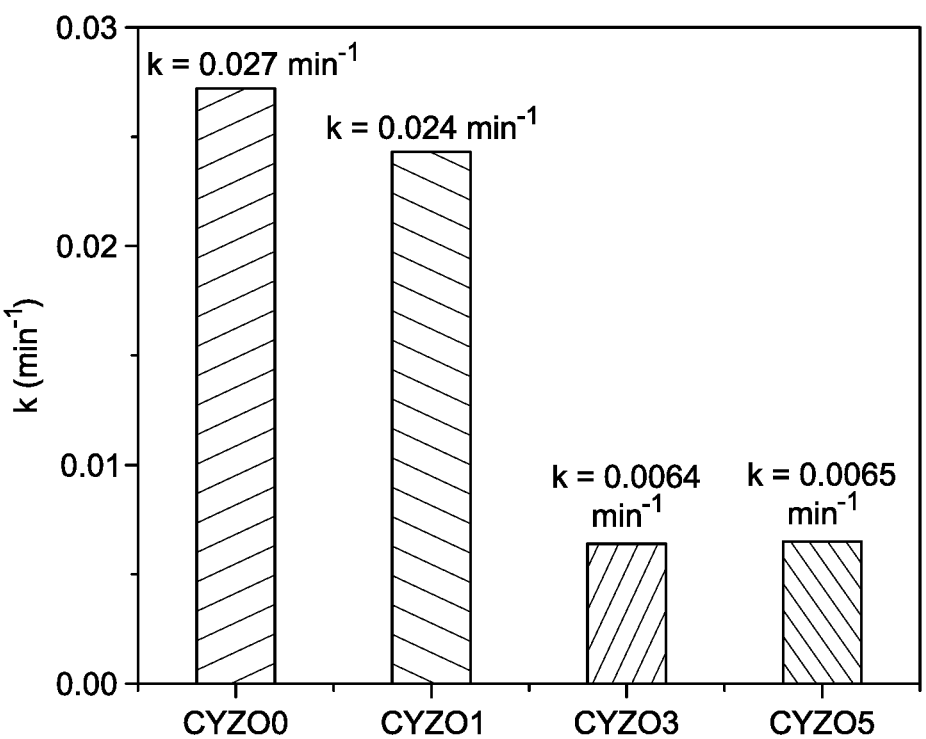
FIG. 9B shows a comparison of rate constants of the photocatalytic degradation reactions carried out using the various nano-photocatalyst samples, according to certain embodiments.

Referring to FIGS. 7A-7D, the time-dependent UV-visible spectra of methyl orange in the presence of the nano-photocatalyst samples (A) CYZO0, (B) CYZO1, (C) CYZO3, and (D) CYZO5 are shown, respectively. Referring to FIG. 8A, the variation of $C_0/C$ versus time for the nano-photocatalyst samples CYZO0, CYZO1, CYZO3, and CYZO5 is depicted. Referring to FIG. 8B, the plot of $\ln(C_0/C)$ versus time for the nano-photocatalyst samples CYZO0, CYZO1, CYZO3, and CYZO5 is depicted. Referring to FIG. 9A, the kinetics of photocatalytic degradation reactions carried out using the nano-photocatalyst samples CYZO0, CYZO1, CYZO3, and CYZO5 are shown. Referring to FIG. 9B, comparing rate constants of the photocatalytic degradation reaction was carried out using the nano-photocatalyst samples CYZO0, CYZO1, CYZO3, and CYZO5 is shown.

As seen in the FIG. 7A-FIG. 7D, the degradation of methyl orange at different time points is depicted. It is observed that the absorption peaks at 464 nm for methyl orange dye diminished progressively with expanded exposure time, indicating the presence of the photocatalytic degradation reaction of methyl orange. As seen from FIGS. 7A-7D and FIG. 8A, this reduction in intensity was higher in the presence of CYZO0 and CYZO1. As indicated, the photocatalytic activity decreases at higher concentrations of co-dopants. As seen in FIG. 9A and FIG. 8A, the percentage degradation of methyl orange reduces from CYZO0 to CYZO5. In the presence of CYZO0 and CYZO1 samples, the percentage degradation of methyl orange was 97.91% and 94.80%, respectively. This percentage degradation is achieved within 100 min to 120 min. With the further rise in the concentration of Yb and Ce, the percentage degradation of methyl orange gets lowered to 44.40% and 48.09% for CYZO3 and CYZO5, respectively.

The improved photocatalytic activity of CYZO0 and CYZO1 samples could be credited to the rapid separation of electron-hole pairs, and the low activity of CYZO3 and CYZO5 may be due to poor electron-hole pair separation and their recombination. The low photocatalytic activity observed in CYZO3 and CYZO5 may also be explained by the shielding of the surface of ZnO owing to the high concentrations of dopants.

Considering FIG. 8B, a linear relationship between $\ln(C_0/C)$ and time (t, mins) is observed, indicative of a pseudo-first-order reaction:

$$\ln\left(\frac{C_0}{C}\right) = kt,$$

where k is the rate constant in $\text{min}^{-1}$.

FIG. 9B shows the rate constants for CYZO0, CYZO1, CYZO3, and CYZO5 samples. The rate constant was found to be 0.027 $\text{min}^{-1}$, 0.024 $\text{min}^{-1}$, 0.0064 $\text{min}^{-1}$, and 0.0065 $\text{min}^{-1}$ for CYZO0, CYZO1, CYZO3, and CYZO5, respectively.

The degradation rate constant values obtained in the as-prepared CYZO0, CYZO1 nano-photocatalysts are higher than those obtained by Kumar et al. (R. Kumar, A. Umar, G. Kumar, M. S. Akhtar, Y. Wang, S. H. Kim, Ce-doped ZnO nanoparticles for efficient photocatalytic degradation of direct red-23 dye, Ceram. Int. 41 (2015) 7773-7782) in pure ZnO NPs (k=0.0084 $\text{min}^{-1}$) and ZnO nanoparticles doped with 5 mol % of Ce element (k=0.0169 $\text{min}^{-1}$). Also, the degradation rate constant values in the CYZO0 and CYZO1 samples are three times greater than those obtained by Djaja et al., where the maximum rate constant of 0.00706 $\text{min}^{-1}$ was achieved for ZnO nanoparticles doped with 9 at % Ce (N. F. Djaja, R. Saleh, Characteristics and photocatalytic activities of Ce-doped ZnO nanoparticles, Mater. Sci. Appl. 4 (2) (2013) 145).

The photocatalytic nanoparticles of the present disclosure exhibit better photocatalytic performance than the prior art. Multiple factors, such as oxygen vacancy, size reduction, and the recombination rate of the electron-hole pairs, may explain this improved performance. It is generally agreed that size plays a significant role in the photocatalytic activities of ZnO nanoparticles. Typically, the smaller the grain/ crystal size of a ZnO sample, the better the photocatalytic activity. In the present disclosure, the average crystallite size D of the nanoparticles is in the range of 53-54 nm, which is larger than in the prior art. Unexpectedly, despite this, the values of rate constant k of CYZO0 and CYZO1 samples are higher than those in the prior art Hence, it may be concluded that the effect of size may not be the main factor responsible for the higher photocatalytic performance of a nanomaterial.

Another reason for the higher values of k and thus better photocatalytic performance of the CYZO1 sample of the present disclosure compared to the previously reported ZnO doped with Ce-only element could be the synergistic combined effect of both Yb and Ce co-doping. Cerium adds new physicochemical properties to ZnO, while ytterbium imparts good optical and dielectric properties. In combination these two dopants provide greater than additive improvement in k.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of degrading a dye in an aqueous solution, comprising:
    contacting nanoparticles with the dye in the aqueous solution; and
    irradiating the aqueous solution,
    wherein the nanoparticles have a formula of $Zn_{1-2x}Ce_xYb_xO$, x=0.01-0.1, and
    wherein at least 90 wt. % of the dye is degraded during the irradiating.

2. The method of claim 1, wherein the nanoparticles have an average crystallite size of less than 40 nm.

3. The method of claim 1, wherein the nanoparticles have an average crystallite size of 51-53 nm.

4. The method of claim 1, wherein the nanoparticles have a unit cell volume of 47.62-47.75 $Å^3$.

5. The method of claim 1, wherein the ZnO of the nanoparticles have a hexagonal crystal system, and wherein at least a portion of the Zn is replaced with Ce and Yb.

6. The method of claim 1, wherein the nanoparticles have a nanorod shape.

7. The method of claim 6, wherein the nanorod shape has a length of 150-250 nm.

8. The method of claim 6, wherein the nanorod shape has a width of 50-70 nm.

9. The method of claim 1, wherein the nanoparticles have a zeta potential of 10-20 mV.

10. The method of claim 1, wherein the nanoparticles have a bandgap of 3.21 to 3.25 eV.

11. The method of claim 1, wherein the nanoparticles further comprise 0.1-1 wt. % $Yb_{0.3}Ce_{0.4}O_{1.85}$, based on the total weight of the nanoparticles.

12. The method of claim 1, wherein the dye is selected from the group consisting of methylene orange, methylene blue, methyl red, phenolphthalein, bromothymol blue, and congo red.

13. The method of claim 1, wherein the irradiating comprises light with a wavelength of 300-700 nm.

14. A method of claim 1, wherein the degrading of the dye has a rate constant of at least 0.02 $min^{-1}$.

15. The method of claim 1, wherein 0.1 to 10 mg/mL of the nanoparticles are present in the aqueous solution.

16. A method of claim 1, wherein the aqueous solution has a temperature of 50 to 70° C.

17. The method of claim 1, wherein the aqueous solution further comprises at least one ionic species selected from the group consisting of ions of alkali metals, alkaline earth metals, halides, carbonates, phosphates, and sulfates.

18. The method of claim 1, wherein the nanoparticles are made by a method comprising:
    mixing separately three solutions of a zinc salt, an ytterbium salt, and a cerium salt each in water;
    mixing together the three solutions at a temperature of 70-90° C. for 30-120 mins to form a reaction mixture;
    adjusting the pH of the reaction mixture to 7 with a base to form a second reaction mixture;
    evaporating the water from the second reaction mixture to form a gel;
    combusting the gel to form a powder; and
    calcining the powder at a temperature of 400 to 600° C.

19. The method of claim 1, wherein the irradiating is for less than 120 minutes.

* * * * *